June 14, 1960 T. F. HURSEN 2,940,545
HAND BRAKE RIGGING FOR RAILWAY CAR TRUCKS
Filed June 20, 1958 3 Sheets-Sheet 1

*INVENTOR.*
THOMAS F. HURSEN
BY
Adelbert A. Steinmiller
ATTORNEY

June 14, 1960 T. F. HURSEN 2,940,545
HAND BRAKE RIGGING FOR RAILWAY CAR TRUCKS
Filed June 20, 1958 3 Sheets-Sheet 2

INVENTOR.
THOMAS F. HURSEN
BY
Adelbert A. Steinmiller
ATTORNEY

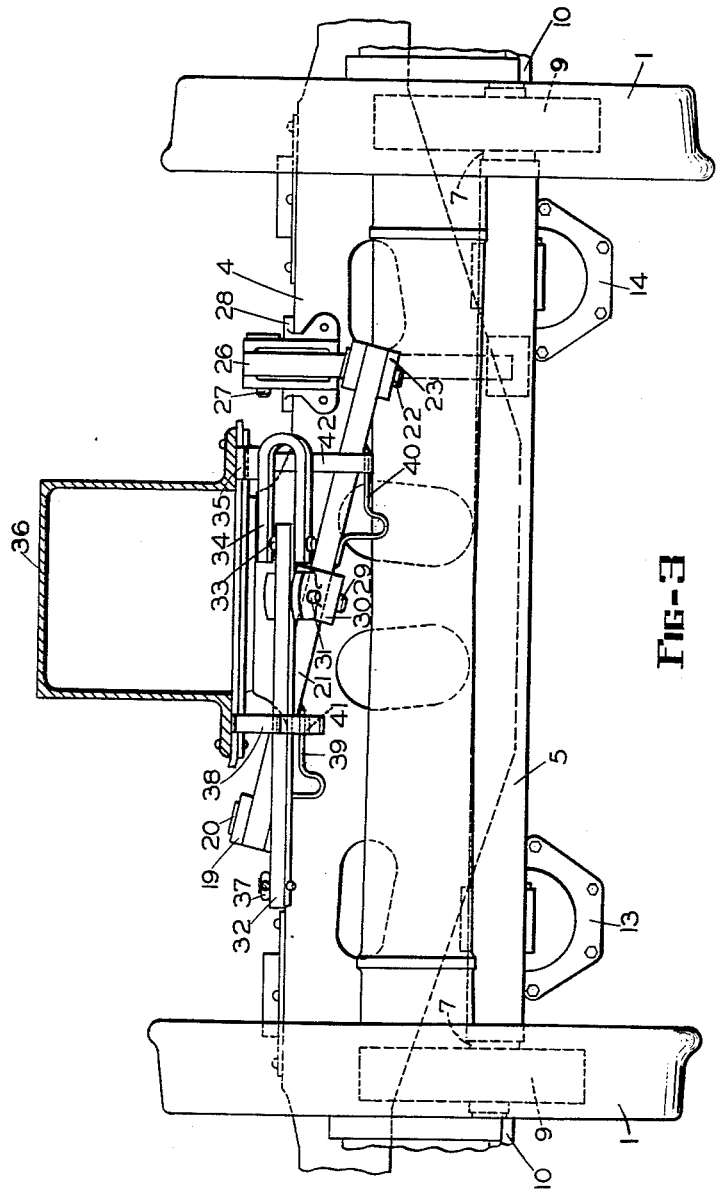

United States Patent Office 2,940,545
Patented June 14, 1960

2,940,545

HAND BRAKE RIGGING FOR RAILWAY CAR TRUCKS

Thomas F. Hursen, Monroeville, Pa., assignor to Westinghouse Air Brake Company, Wilmerding, Pa., a corporation of Pennsylvania Filed June 20, 1958, Ser. No. 743,395

6 Claims. (Cl. 188—52)

This invention relates to hand brake rigging for railway car trucks, and more particularly, to rigging for manually effecting the application of braking forces to the wheels of a car truck through brake-shoe carrying brake beams.

Brake riggings of the type comprising two or more parallel brake beams guidably supported at their ends on the truck side frames or in other ways are well known in the art. According to the type of brake beams used, hand brake riggings of variously types have been employed for applying braking forces manually to the brake beams.

Recently, it has been proposed to provide a new and simplified type of brake rigging or assemblage in which brake cylinders are carried directly on one brake beam with the free end of the brake cylinder piston rod operatively connected to an adjacent brake beam such that upon a supply of fluid pressure to the brake cylinders, the brake beams are forced in generally opposite directions to effect application of the brake shoes to the car wheels. The copending application of George K. Newell, U.S. Serial No. 682,181, filed September 5, 1957, and assigned to the assignee of the present invention, discloses one such arrangement.

Existing types of hand brake riggings are not adapted for use with the new and simplified type of brake rigging. It is therefore the object of this invention to provide a hand brake rigging suited for use with the new and simplified type of brake rigging.

According to the invention a novel hand brake rigging is provided for use on a railway car of the type comprising a car body, a wheel-supporting car truck having a transversely extending truck bolster, and a brake assemblage comprising a pair of parallel brake-shoe carrying brake beams supported by the car truck, which hand brake rigging comprises a lever system an equalizer bar disposed at an angle to the horizontal and on which a pulling force is exerted through a lever fulcrumed to the center sill of the car body, the opposite ends of the equalizer bar being connected respectively to a pair of vertical levers fulcrumed to and on opposite sides of the truck bolster. One vertical lever cooperates with one end of one brake beam to move it in a brake applying direction while the other vertical lever cooperates with the opposite end of the other brake beam to move it correspondingly in a brake applying direction when a pulling force is manually applied to the equalizer bar, the force applied to the equalizer bar being divided substantially equally, whereby the braking forces applied to the wheels by the brake shoes on the same side of the car truck will be unequal and the braking forces exerted by the brake shoes on the diagonally opposite wheels on the car truck will be substantially equal, thereby causing a substantial balance of turning moments to be exerted on the car truck by the application of the brakes.

In the accompanying drawings, Fig. 1 is a plan view of a railway car truck of the two-axle type, showing the hand brake rigging comprising the present invention installed thereon;

Fig. 3 is a fragmentary end view of the car truck shown in Fig. 1 and drawn to the same scale as Fig. 2, with the car truck side frames broken away and the car body center sill added.

Description

Figure 1:
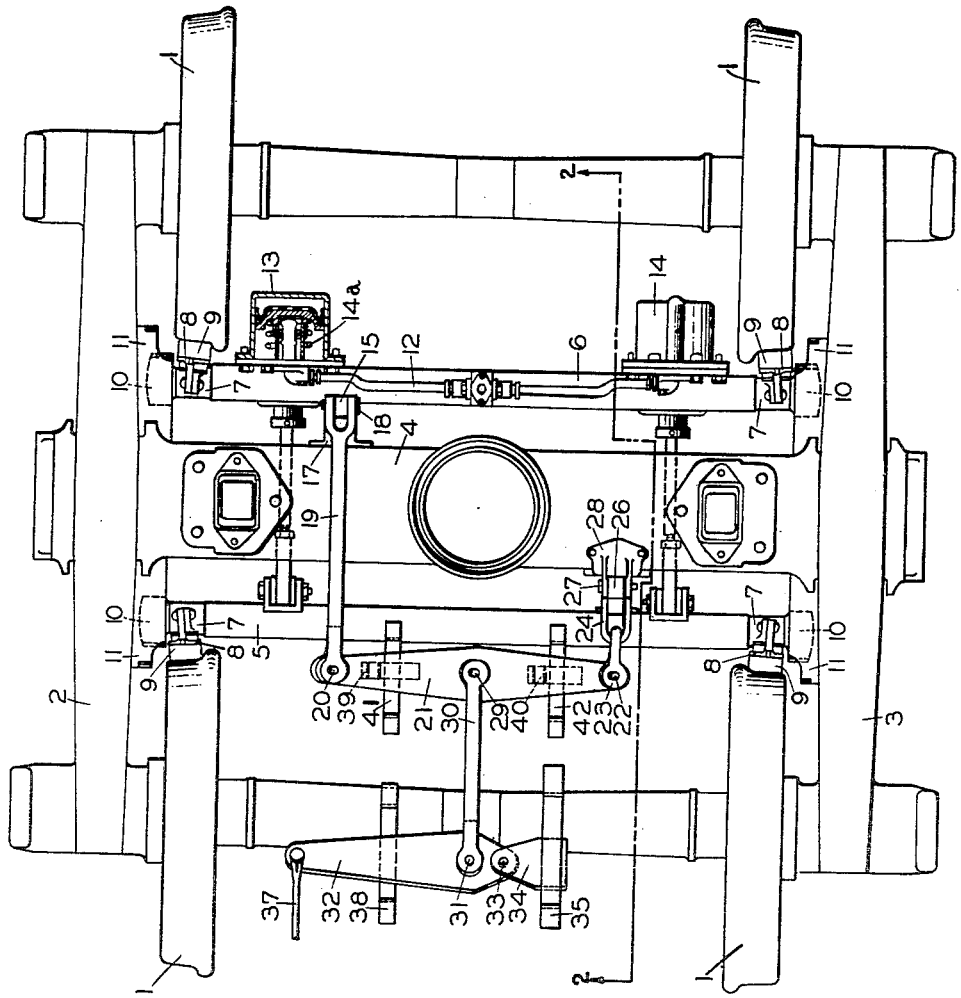

Referring to the drawings, in Fig. 1 there is shown a conventional railway car truck of the two-axle type comprising the usual wheels 1, fixed at opposite ends of the axles, a pair of oppositely disposed truck side frames 2 and 3, and a truck bolster 4 the opposite ends of which are sprung-supported in the well-known manner in openings in the center of each side frame.

Also shown, associated with the car truck, is a brake rigging assemblage of the type comprising a pair of parallel brake beams 5 and 6, disposed respectively on opposite sides of the bolster 4. Brake beams 5 and 6 have rigidly secured at their respective ends extending portions 7 that have an integrally formed flange to which brake heads 8, carrying brake shoes 9, are suitably fastened as by rivets. Each portion 7 is formed at its end as a rectangular brake beam guide foot 10.

Brake beams 5 and 6 are slidably supported on the side frames 2 and 3 by sliding engagement of the guide feet 10 in respective inclined channels 11 defined by two parallel ledges formed integrally with the inboard side of side frames 2 and 3. Brake beams 5 and 6 are power-operated in opposite directions away from each other by the action of fluid pressure supplied as through a pipe 12 to brake cylinders 13 and 14 mounted on brake beam 6, the free ends of the respective piston rods of cylinders 13 and 14 being operatively connected to brake beam 5.

Engagement of the brake shoes 9 with the tread of the wheels and a consequent brake application thus results from the supply of fluid under pressure to the brake cylinders 13 and 14. Upon release of fluid under pressure from the brake cylinders 13 and 14, the brake beams return, partly by their own weight and partly by the force of release springs 14a (Fig. 1) in the brake cylinders, back towards each other to disengage the brake shoes from the wheel tread surface to effect release of the brakes.

Figure 2:
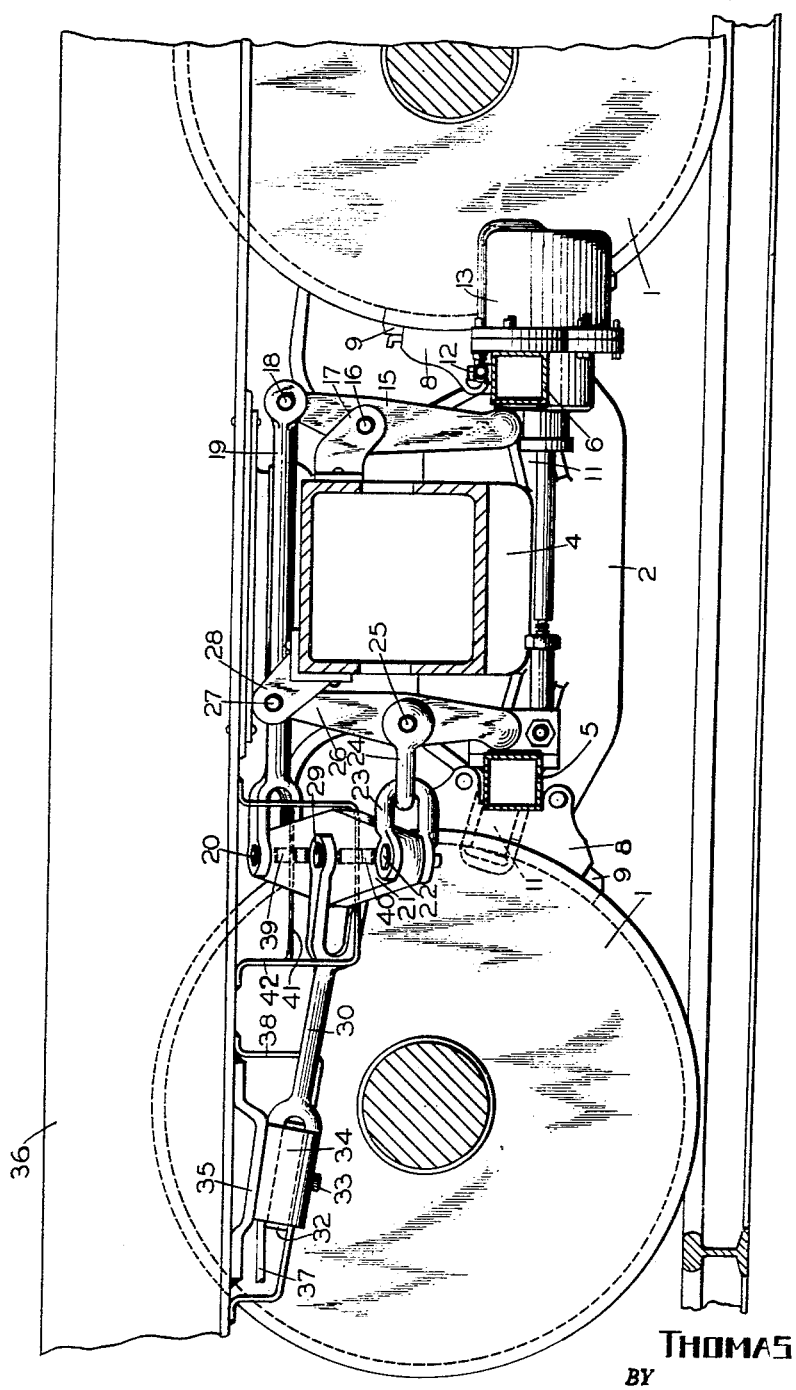
Fig. 2 is a sectional view, taken along the line 2—2 of Fig. 1 and drawn to a larger scale, with the center sill of the car body added.

Figs. 1, 2 and 3 more specifically show, according to the invention, a hand-brake arrangement, associated with the car truck comprising a vertically extending lever 15 interposed between bolster 4 and brake beam 6 and fulcrumed intermediate its ends as by a pin 16 (Fig. 2), on a bracket 17, suitably secured to the side wall of the bolster 4 near one end thereof. The upper end of vertical lever 15 is pivotally connected as by a pin 18, to the forked end of a pull rod 19 that extends lengthwise above and across the top of the bolster 4 and is pivotally connectd as by a pin 20, at its opposite forked end to the upper end of an equalizer bar 21 (see Fig. 2) at the opposite side of the bolster. Equalizer bar 21 extends transversely of the car truck and at a slight downward angle to the horizontal so that the opposite end of the equalizer bar is somewhat lower than the upper end. At its lower end, equalizer bar 21 is pivotally connected, as by a pin 22, to a U-link 23 that is interlocked with a semi-lar U-link 24 that is in turn pivotally connected as by a pin 25 (Fig. 2), to another vertical level 26 at a point intermediate the ends of lever 26. Lever 26 is interposed between brake beam 5 and bolster 4 and is fulcrumed at its upper end as on a pin 27, to a bracket 28 that is suitably secured, as by welding, to the bolster 4 in diagonally opposite relationship with bracket 17.

Equalizer bar 21 is pivotally connected at a point substantially midway between its ends, as by a pin 29, to the bifurcated end of a connecting link or rod 30 that extends substantially along the longitudinal center line of the car truck, the rod 30 being pivotally connected at its opposite bifurcated end as by a pin 31, to a generally horizontal lever 32 at a point intermediate the ends of the lever.

Horizontal lever 32 is pivotally connected at one end as by a pin 33, to a U-shaped bracket 34 which is suitably secured, as by welding, to a strap or bracket 35, also attached, as by welding, to the lower flange of the car center sill 36 (Figs. 2 and 3). Strap 35 is of such a configuration as to support bracket 34 and therefore lever 32 at an angle of about 7 degrees to the horizontal and sloping downwardly in the direction of the bolster 4. At its opposite or free end, horizontal lever 32 has connected thereto a hand brake cable 37 or the like, for applying a pulling force, as by any well-known mechanism, to the lever 32 and consequently to the entire rigging. Lever 32 is movably supported intermediate its ends by a bracket 38 preferably welded to the car center sill 36.

Suitably secured, as by welding, to the lower side of the equalizer bar 21 are two strap members 39 and 40 (see Fig. 3). Strap members 39 and 40 are so formed as to provide horizontal surfaces which rest on and have slidable engagement with respective generally U-shaped strap-like supports 41 and 42, in turn attached to the lower flange of the center sill 36.

Operation

To apply brakes manually, a pulling force is applied to the horizontal lever 32 through cable 37 for causing said lever to swing counterclockwise, as viewed in Fig. 1, about pin 33 from a release position to a brake applying position in which it is shown in the drawings, to thereby, via connecting link 30, pull equalizer bar 21 and therefore pull rod 19 and links 23, 24 leftward. Since pull rod 19 is connected pivotally to the upper end of vertical lever 15, leftward movement of pull rod 23 will cause lever 15 to swing about pin 16 in a counterclockwise direction as viewed in Fig. 2, and thereby cause the free end or toe of lever 15 to engage brake beam 6. Since link 24 is connected to vertical lever 26, leftward movement of link 24 will cause lever 26 to swing in a clockwise direction about pin 27, as viewed in Fig. 2, to cause the toe of lever 26 to engage brake beam 5. Thus, after vertical levers 15 and 26 are brought into engagement with brake beams 6 and 5 respectively, further movement of horizontal lever 32 will cause levers 15, 26 to move brake beams 5 and 6 apart against the force of release springs 14a of brake cylinders 13, 14 for thereby causing the brake shoes 9 to be carried into frictional braking engagement with the wheels 1. With brakes manually applied, all components will be in the respective positions in which they are shown in the drawings.

By reason of the fact that the free end or toe of each vertical lever 15 and 26 is not joined in any way to the brake beams on which they exert braking force but have a vertically slidable contact with a side surface of a brake beam, relative movement of the truck bolster 4 vertically with respect to the brake beams such as occurs upon variations in load carried by the car truck, is freely permitted at all times without interference.

It will be noted that levers 15 and 26 exert a force near the ends of brake beams 6 and 5 respectively and therefore the braking forces transmitted to the car wheels 1 by the brake shoes 9 connected at the ends of each respective brake beam 5 and 6 will be unequal. However, since levers 15 and 26 are disposed at substantially corresponding diagonally opposite sides of the bolster 4 and exert said force near diagonally opposite ends of each respective brake beam 5 and 6, the braking force applied by each diagonally opposite brake shoe 9 of respective brake beams 5 and 6 to diagonally opposite wheels 1 will be equal; and, although one wheel is braked at a higher braking ratio than the other wheel on the same side of the car truck, the total braking force on each side of the car truck will be substantially equal, thereby causing a substantial balance of turning moments to be exerted on the car truck by the application of the brakes.

To release a manual application of brakes, the force applied to horizontal lever 32 is relieved thereby enabling the force of the brake cylinder return springs 14a, aided by the weight of the brake beams, to shift the brake beams 5 and 6 concurrently toward each other and the bolster 4 to their respective release positions. In the release positions of the brake beams, the brake beam guide feet 10 are in their lowermost position within the channels 11 as defined by contact of the inner vertical face of at least one of said guide feet with a stop shoulder (not shown) formed integrally with the aforementioned ledges which define the corresponding channel.

Movement of brake beams 5 and 6 toward and to their release positions causes vertical lever 26 to swing counterclockwise about pin 27 and vertical lever 15 to swing clockwise about pin 16, respectively, and thereby cause pull rod 19, links 23 and 24, equalizer bar 21, and horizontal lever 32 to be shifted to the right, as viewed in Fig. 1, to their respective release positions.

Having now described the invention, what I claim as new and desire to secure by Letters Patent is:

1. A hand brake arrangement for use with brake assemblages of the type comprising parallel brake-shoe carrying brake beams disposed on opposite sides of a transversely extending bolster of a wheel-supporting railway car truck; said arrangement comprising a pair of generally vertical levers respectively fixedly fulcrumed to opposite sides of the bolster and each having a free end movable into contact with a corresponding contact face on a corresponding one of the brake beams, and manually operable lever means operatively connected to both of said levers for concurrently rocking said vertical levers in opposite directions with respect to their fulcrums to thereby cause the free ends of said levers to contact and move the brake beams apart for applying a braking force to the wheels.

2. A hand brake arrangement for use with brake assemblages of the type comprising parallel brake-shoe carrying brake beams which are disposed at opposite sides of a transversely extending bolster of a wheel-supporting railway car truck and are biased generally toward each other and shifted apart by power means for applying a braking force to the associated wheels; said arrangement comprising a pair of generally vertical levers each fulcrumed to and on opposite sides of the truck bolster and each capable of applying a force to a respective one of the brake beams to shift it in a brake applying direction, an equalizer bar, a pull rod for connecting said equalizer bar adjacent its one end to one of said vertical levers, link means for connecting said equalizer bar adjacent its opposite end to the other of said vertical levers, and manually operable means for applying a pulling force to said equalizer bar at a point substantially midway between the points of connection with said pull rod and said link means, whereby substantially equal pulling forces are transmitted through said equalizer bar to each of said vertical levers for causing said vertical levers to be rocked in opposite directions with respect to their fulcrums and by engagement with the respective brake beams to spread the latter for applying a braking force to the wheels.

3. A hand brake arrangement for use with brake assemblages of the type comprising parallel brake-shoe carrying brake beams disposed on opposite sides of a transversely extending bolster of a wheel-supporting railway car truck; said arrangement comprising a pair of generally vertical levers each fulcrumed to and on opposite sides of the truck bolster and capable of applying a brake applying force to a respective one of the brake beams, a generally horizontal lever, an equalizer bar inclined at an angle to the horizontal and disposed between said vertical levers and said horizontal lever, a pull rod disposed above said bolster for connecting said equalizer bar adjacent its one end to one of said vertical levers, first link means for connecting the other end of said equalizer bar to the other of said vertical levers, and second link means for connecting said horizontal lever to said equalizer bar at a point substantially midway between the points of connection with said pull rod and said first link means, whereby a pulling force applied to said horizontal lever will be transmitted to said equalizer bar via said second link means, and substantially equal pulling forces are transmitted from said equalizer bar to each of said vertical levers for rocking said vertical levers about their fulcrums in opposite directions to thereby move the brake beams apart for applying a braking force to the wheels.

4. For use on a railway car of the type comprising a car body, a wheel, supporting car truck having a transversely extending truck bolster, and a brake assemblage comprising a pair of parallel brake-shoe carrying brake beams supported by the car truck; a hand brake arrangement comprising a generally horizontal lever fulcrumed at one end to the car body, an equalizer bar inclined at a slight angle to the horizontal, a connecting link pivotally connected at one end to said horizontal lever intermediate its ends and pivotally connected at its opposite end to said equalizer bar at substantially the midpoint lengthwise thereof, one vertical lever fulcrumed intermediate its ends to one side of the bolster, a second vertical lever fulcrumed at its upper end to the opposite side of the bolster from said one vertical lever, a pull rod having a clevis-like connection with one end of said equalizer bar and being pivotally connected at its opposite end to the upper end of said one vertical lever, one U-link pivotally connected to the other end of said equalizer bar, another U-link that is interlinked with said one U-link and is pivotally connected to said second vertical lever intermediate its ends, such that when a manual braking force is applied to said horizontal lever to cause the latter to rock about its fulcrum, said first and second vertical levers will be rocked in opposite directions to thereby push the brake beams apart for applying a braking force to the wheels of the car truck.

5. The combination according to claim 4 further characterized in that the said one vertical lever is fulcrumed to one side of the bolster adjacent one end thereof and said second vertical lever is fulcrumed at the other side of the bolster adjacent the opposite end thereof, the arrangement being such that when a manual braking force is applied to said horizontal lever to cause the latter to rock upon its fulcrum, said vertical levers will exert a force against a respective brake-shoe carrying brake beam at corresponding diagonally opposite points on each respective brake beam for causing substantially equal braking forces to be applied to the diagonally opposite wheels to thereby cause an application of the brakes with a substantial balance of turning moments to be exerted on the car truck by the application of brakes.

6. A hand brake arrangement for use with brake assemblages of the type comprising parallel brake-shoe carrying brake beams disposed on opposite sides of a transversely extending bolster of a wheel-supporting railway car truck; said arrangement comprising a pair of generally vertical levers respectfully fulcrumed to opposite sides of the bolster, each of said vertical levers having a free end or toe that is movable into slidable contact with a side surface of a respective brake beam, and manually operable lever means operatively connected to both of said levers for concurrently rocking said vertical levers with respect to their fulcrums to thereby move the brake beams for applying a braking force to corresponding wheels of the car truck.

References Cited in the file of this patent
UNITED STATES PATENTS

| | | |
|---|---|---|
| 1,444,018 | Westlake | Feb. 6, 1923 |
| 1,480,540 | Irie | Jan. 8, 1924 |
| 2,832,440 | Browall | Apr. 29, 1958 |